UNITED STATES PATENT OFFICE.

HARVEY A. REYNOLDS, OF BROOKLYN, NEW YORK.

IMPROVEMENT IN THE METHODS OF PRODUCING STEREOSCOPIC PICTURES.

Specification forming part of Letters Patent No. 193,998, dated August 7, 1877; application filed April 23, 1877.

*To all whom it may concern:*

Be it known that I, HARVEY A. REYNOLDS, of Brooklyn, in the county of Kings and State of New York, have invented a new and Improved Method of Making Stereoscopic Pictures, of which the following is a specification:

In making stereoscopic pictures in the ordinary manner the picture is taken upon a sensitive plate, either as a positive or negative. The former, and also the prints from the latter, must be transposed to give the picture a stereoscopic effect when viewed through the stereoscope.

As the transposition of these pictures is a delicate operation, requiring great care and accuracy, it often occurs that the pictures are improperly placed in relation to each other, so that it is difficult or altogether impossible to see the pictures in the stereoscope.

To obviate these difficulties, and to rapidly produce accurate stereoscopic pictures, is the object of my invention.

In producing stereoscopic pictures by my improved process, I take with an ordinary two-tubed camera a double positive upon any of the surfaces in common use. This positive is reversed and non-stereoscopic. I now take the double positive picture just described and place it in the position in which it was taken before the two-tubed camera, with one of the pictures in front of each tube, and copy it. The tube through which the right-hand picture was taken now copies the left-hand picture, and, similarly, the tube through which the left-hand picture was taken copies the right-hand picture, and at the same time the pictures are reversed and transposed, so that they are accurate representations of the subject, and are stereoscopic.

When the camera is once adjusted to copy the reversed positive, duplicates can be produced with greater rapidity than by the process of photographic printing, and they are more accurate, as they are not separated when transposed.

It is obvious that the effect herein described may be produced by using a single tube and sliding it, in place of using a camera having two tubes. Therefore I do not confine myself to the use of two tubes.

Having thus described my invention, I claim as new and desire to secure by Letters Patent—

The method of producing stereoscopic pictures by making a double positive and copying the stereoscopic picture therefrom by means of a one or two tubed camera, substantially as described.

HARVEY ALEXANDER REYNOLDS.

Witnesses:
 C. SEDGWICK,
 ALEX. F. ROBERTS.